United States Patent [19]
Tanis

[11] Patent Number: 5,145,461
[45] Date of Patent: Sep. 8, 1992

[54] DOOR ASSEMBLY FOR AN AXIAL-FLOW COMBINE

[75] Inventor: Dale R. Tanis, Naperville, Ill.

[73] Assignee: Case Corporation, Racine, Wis.

[21] Appl. No.: 673,776

[22] Filed: Mar. 21, 1991

[51] Int. Cl.⁵ .............................................. A01F 12/10
[52] U.S. Cl. ........................................ 460/67; 460/68; 460/119
[58] Field of Search ............... 460/67, 68, 69, 70, 460/84, 107, 119; 56/14.6

[56] References Cited

U.S. PATENT DOCUMENTS

| | | | |
|---|---|---|---|
| 3,827,443 | 8/1974 | Drayer | 460/70 |
| 4,489,733 | 12/1984 | Underwood | 460/68 |
| 4,665,929 | 5/1987 | Helm | 460/67 |
| 4,900,290 | 2/1990 | Tanis | 460/70 |

*Primary Examiner*—Terry Lee Melius
*Attorney, Agent, or Firm*—Dressler, Goldsmith, Shore, Sutker & Milnamow, Ltd.

[57] ABSTRACT

A door assembly for an axial-flow combine having a crop receiving and generally tubular rotor casting defining an elongated axis, a rotor coaxially disposed within the casing, and a vaned impeller arranged at a forward end of the rotor. The door assembly extends across and at least partially closes a forward open end of the casing. At least a portion of the door assembly has a surface configuration extending circumferentially about its outermost edge for positively moving crop material axially rearward through the rotor casing to reduce crop material repeat on the downward rotational direction side and improving endwind efficiency.

10 Claims, 4 Drawing Sheets

DOOR ASSEMBLY FOR AN AXIAL-FLOW COMBINE

FIELD OF THE INVENTION

The present invention generally relates to combines and, more particularly, to an axial-flow combine having a door assembly configured to positively move crop material rearwardly toward threshing instrumentalities on a rotor of the combine.

BACKGROUND OF THE INVENTION

A common and well known form of harvesting machine is a rotary combine. Rotary combines are available in various designs and models to perform the basic functions of harvesting, threshing, and cleaning of grain and other crop materials.

A typical combine includes a crop harvesting apparatus which reaps planted grain stalks and then feeds the grain stalks to a separating or threshing apparatus. The grain stalks or other crop harvested in the field is rearwardly moved from the crop harvesting apparatus and introduced to a threshing assembly by a feeder mechanism.

In axial-flow combines, the threshing assembly includes a generally tubular rotor casing mounted on a frame of a combine and a driven rotor disposed within the casing in co-axial relationship therewith. The rotor and casing have cooperating threshing instrumentalities arranged thereon for separating and threshing grain from material other than grain. In such a combine, which has been available for a number of years, the grain is threshed several times repeatedly, but gently, as it spirals around the rotor and passes through openings in the rotor casing.

The ability to transfer material from the feeder mechanism to the rotor assembly is a key factor in efficient and effective combine operation. To enhance the transfer of crop material, some axial-flow combines, configure a forward end of the rotor casing with an outwardly flared funnel-like frusto-conical transition section. The transition section surrounds a vaned impeller arranged at a forward end of the rotor.

At the discharge end thereof, the feeder mechanism introduces a continuous mat of crop material, having a width approximately equal to the width of the open end of the transition section, to the rotor assembly. The vaned impeller receives material in an undershot manner from the feeder mechanism and moves the material radially outward toward the transition section. The inner surface of the transition section combines with the impeller in moving the crop material axially rearward toward the threshing instrumentalities on the rotor.

Since there is considerable backlash of material which is "chewed" from the mat of crop material issuing from the feeder mechanism, conventional axial-flow combines provide a planar end wall or door transversely extending across a forward end of the rotor casing to confine the crop material which is fed into the rotor casing. Residual crop material which is not moved axially rearward toward the threshing instrumentalities on the rotor tends to whirl about the face and periphery of the impeller and reduces combine efficiency. Besides tending to wrap about a forward bearing mount for the rotor assembly, such residual crop material tends to create a backfeed problem for the feeder mechanism. As will be appreciated, such problems hinder operativeness of the combine thereby reducing combine capacity.

Where a planar end wall is employed, it has been found that the backlash of crop material impacts against such wall and builds up thereon. Ultimately, this residual crop material forms a circular cake which clogs the impeller due to the upthrust of material on one side of the rotor casing and the downthrust of material on the other side thereof. Thus, a rotating circular disk of material is created within the rotor casing in advance of the impeller. As this disk becomes thicker, it eventually establishes a solid circular mat which can no longer rotate and, ultimately, causes the engine to stall. As will be appreciated, moist crop materials further aggravate the problem. To clean and clear this problem, of course, requires valuable time which is a premium during a harvesting operation.

Therefore, there is a need and a desire for a device which improves the rearward movement of crop material toward the threshing instrumentalities on the rotor in a manner reducing or avoiding backfeed to the feeder mechanism and prevents crop from wrapping about the front rotor bearing.

SUMMARY OF THE INVENTION

In view of the above, the present invention provides an improvement over conventional axial-flow combines having a generally tubular rotor casing defining an elongated axis, a rotor disposed within the casing in coaxial relationship therewith for separating and threshing crop material as the rotor is driven, and a vaned impeller arranged at a forward end of the rotor. The improvement to such combines includes a door assembly extending across and at least partially closing a forward open end of the rotor casing. About a periphery thereof, at least a portion of the door assembly has a ramped configuration which positively moves crop material axially rearward through the rotor casing in a manner substantially eliminating heretofore known feedback problems.

In a preferred form of the invention, the rotor casing has an outwardly flared funnel-like frusto-conical transition section arranged to receive crop material from a feeder mechanism. The vaned impeller and the transition section on the rotor casing are sized relative to each other to define an annular space therebetween through which crop material is fed. A series of spiral transport vanes are secured to the inner surface of the transport section to facilitate rearward crop material movement therethrough.

The ramped configuration on the door assembly directs the crop material, as it reaches the peripheral limits of the door assembly, to slide rearwardly into the open annular space between the vaned compeller and the transition section of the rotor casing. The door assembly provides an open area extending along the upper rotational direction side of the impeller to allow room for crop material to endwind over a leading edge of the impeller plan of rotation. The size of the open area decreases from the upper rotational direction side to the downward rotational direction side of the impeller to induce crop material to move rearwardly through the impeller area of the rotor.

In a preferred form, the door assembly has a ramped portion peripherally extending about its outer edge to induce the crop material, as it reaches its peripheral limits, to slide rearwardly toward threshing instrumentalities on the rotor. The configuration of the ramped portion changes as a function of its angular disposition about the casing to provide maximum directional influence to the crop material and a substantially consistent entrance clearance at the impeller tip orbit. Preferably, the ramped surface has a convex configuration extending about the peripheral edge of the door assembly. In a most preferred form of the invention, a ramped surface portion of the door assembly extends below the axis of the casing to positively impart rearward direction to the crop material throughout its travel about a forward end of the rotor casing.

The door assembly is preferably configured with an anti-wrap vane which substantially encompasses a front bearing mount for the rotor. This vane inhibits crop material from wrapping about the bearing mount and thereby reduces downtime for the combine.

The provision of such a door assembly reduces crop material repeat on the downward rotational direction side of the impeller by improving endwind efficiency of the impeller. Positively imparting rearward axial movement of the crop material at a forward end of the impeller furthermore reduces backfeed to the feeder mechanism. Another advantage of the door assembly according to the present invention is a reduction in the power consumption for the rotor and more efficient combine operation. Moreover, a door assembly embodying features of the present invention reduces those areas at the forward end of the rotor in which crop material may accumulate and, ultimately, plug operation of the rotor assembly.

Numerous other features and advantages of the present invention will become readily apparent from the following detailed description, the accompanying drawings, and the appended claims.

DETAILED DESCRIPTION OF A PREFERRED EMBODIMENT

Figure 1:
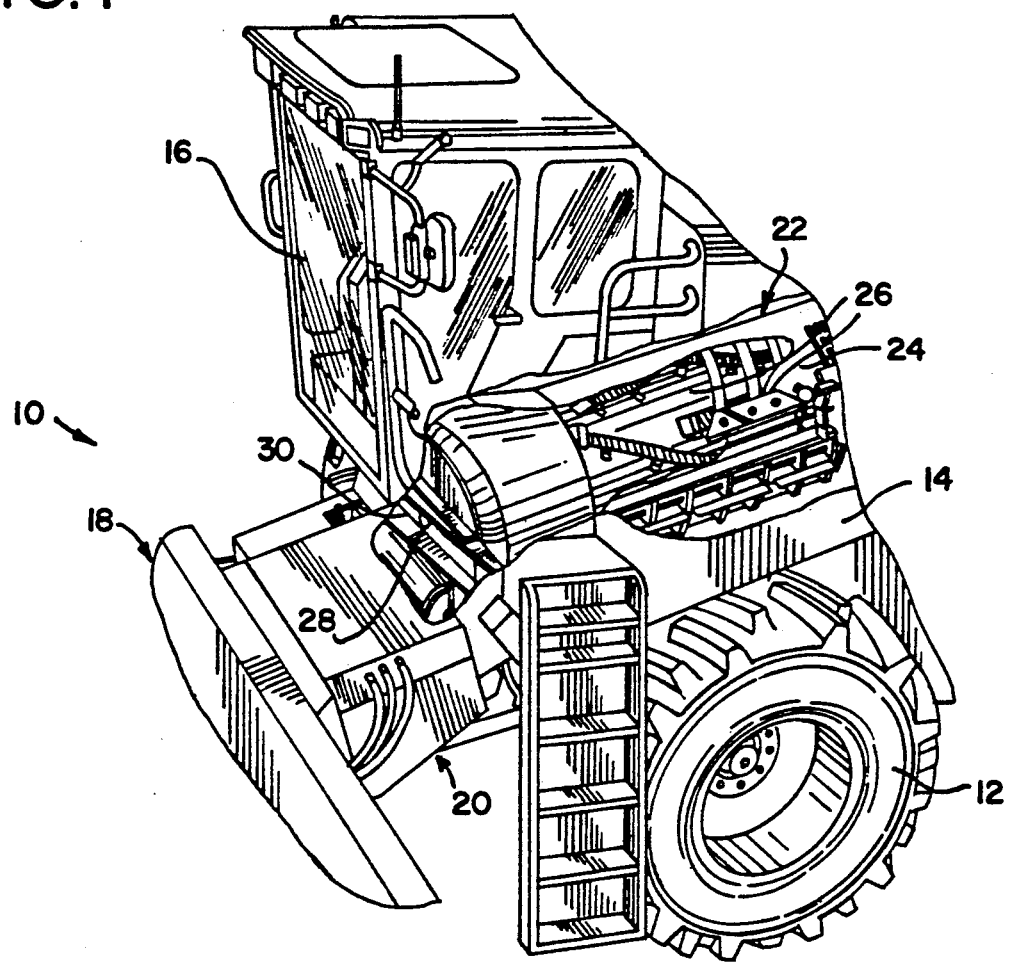
FIG. 1 is a fragmentary perspective view, partially broken away, of a combine equipped with the present invention.

While the present invention is susceptible of embodiment in various forms, there is shown in the drawings a preferred embodiment of the invention which is hereinafter described, with the understanding that the present disclosure is to be considered as an exemplification of the invention, and is not intended to limit the invention to the specific embodiment illustrated.

Referring now to the drawings, wherein like reference numerals indicate like parts throughout the several views, there is shown in FIG. 1 a self-propelled combine 10 having front drive wheels 12. The combine 10 further includes a body 14 having an interconnected supporting structure or frame which defines an operator station 16.

The combine is operatively powered by an engine (not shown) suitably supported and housed within body 14 and which provides driving power for the combine. The transfer of rotation and power from the engine to various driven components of the combine is by conventional devices and could include fixed or variable belt or chain drives which are not shown or described herein but are well known in the art.

At its front end, the combine is provided with a crop harvesting apparatus or header 18 which can be of suitable design. The crop harvesting apparatus 18 cuts and directs crop material toward a crop feeder mechanism 20. The crop feeder mechanism 20 preferably includes a conventional chain and slat conveyor that advances crop material in a crop layer or mat toward an axial-flow rotor assembly 22 which acts to separate and thresh grain from material other than grain.

The rotor assembly 22 is conventionally supported inside the body 14 of the combine 10. As is the case in connection with axial-flow combines of the type hereunder consideration, the rotor assembly 22 embodies crop threshing and separating means in a single unit. More specifically, the rotor assembly 22 includes a generally tubular rotor casing or housing 24 mounted in a fore-and-aft direction in the combine along an elongated axis and a generally cylindrical rotor 26. The rotor casing 24 and rotor 26 have cooperating threshing instrumentalities arranged thereon for threshing and separating grain from material other than grain.

The rotor 26 is journalled in generally coaxial relationship within the casing 24 by a front bearing 28 and a rear bearing (not shown). The front bearing 28 is supported by a transverse rotor supporting member 30 which extends across the forward end of the rotor casing 24 and is rigidly secured to the frame of the combine.

Figure 2:
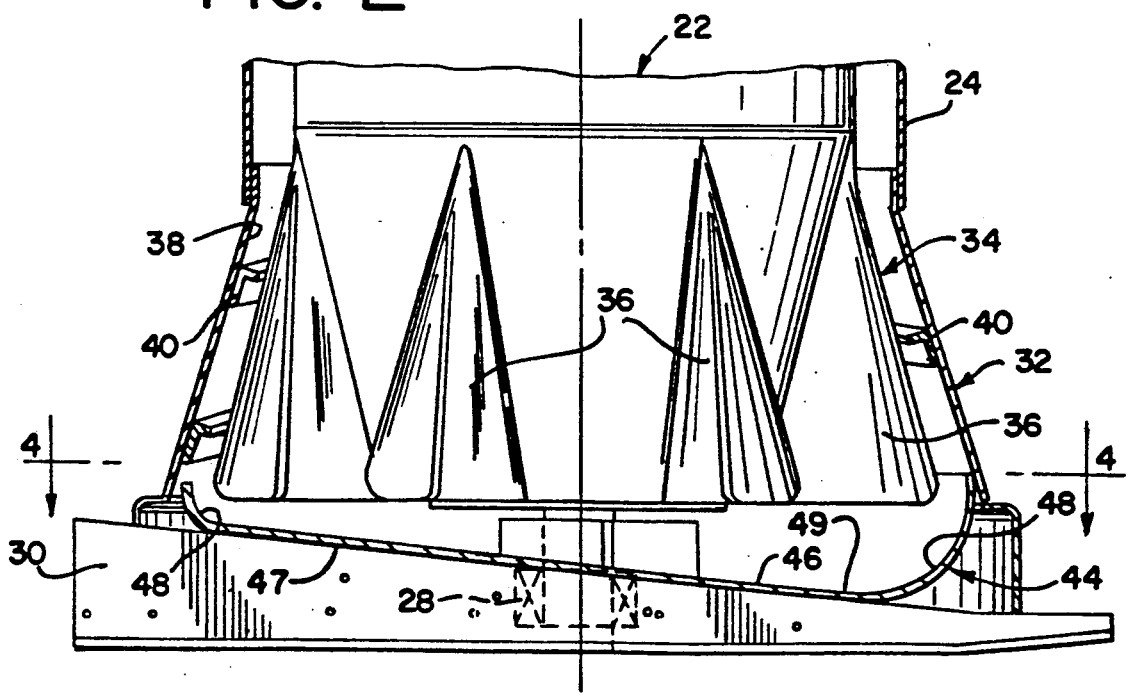
FIG. 2 is an enlarged longitudinal sectional view of a forward end of a rotor assembly for the combine illustrated in FIG. 1.

Turning to FIG. 2, at its forward end, the rotor casing 24 has an open-ended transition section 32 which may be regarded as a forward extension of the tubular rotor casing 24. The transition section 32 is arranged in crop receiving relation with the feeder mechanism 20 (FIG. 1). In the preferred embodiment, transition section 32 is provided with an outwardly flared funnel-like frusto-conical configuration which is suitably secured to the support member 30. As illustrated, the transition section 32 has a decreasing cross-sectional area in a downstream direction extending between fore-and-aft ends thereof. The configuration of the transition section functions to "funnel" the crop material axially rearwardly through the rotor casing.

As shown in FIG. 2, a vaned impeller 34 is arranged within the transition section 32 for rotation with the rotor 26. The impeller 34 includes a plurality of circumferentially and equally spaced vanes or blades 36. Each blade 36 is rigidly secured along an inner edge to a mounting surface on the rotor 26. Each blade 36 has an outer working edge having a declining slope in the downstream direction of the rotor 26. Between its inner and outer edges, each blade 36 preferably has a somewhat twisted form configured to draw air and crop material into the transition section 32 and move it toward the threshing instrumentalities on the rotor.

When the rotor 26 is driven, the working edge of the blade generates a cone frustum trace having a slant angle which is substantially equal to the slant angle of the frusto-conical transition section 32 of the rotor casing 24. A small annular clearance or opening 38 is defined between the working edge of the bladed impeller and the inner surface of the transition section 32. It is through this annular clearance opening that crop material is moved axially rearwardly toward threshing instrumentalities on the rotor assembly. A plurality of spiral transport vanes 40 are supported on an internal wall surface of the transition section 32 and extend into the annular opening or space 38 to facilitate axial rearward movement of the crop material through the transition section 32 of the rotor assembly.

In the preferred embodiment, the rotor 26 and, therefore, impeller 34 turn in a counterclockwise direction as viewed from a front end of the combine. Accordingly, crop material issuing from the feeder mechanism 20 (FIG. 1) is elevated by the upwardly moving blades 36 which pass across the general plane of the crop material issuing from the feeder. Crop material is propelled outwardly and circumferentially about the forward end of the transition section by the blades 36. As the blades 36 on the left side of the transition section descend, fresh crop material, introduced into the path of the blades, is carried downwardly.

According to the present invention, a partially cup-shaped multi-piece door assembly 44 extends across and at least partially closes a forward open end of the transition section 32. In a preferred form, the door assembly 44 is releasably secured to the rotor support member 30 forwardly of the impeller 34 (FIG. 2). A portion of the door assembly 44 extends above and, preferably, below the extended axis of the rotor assembly.

Figure 3:
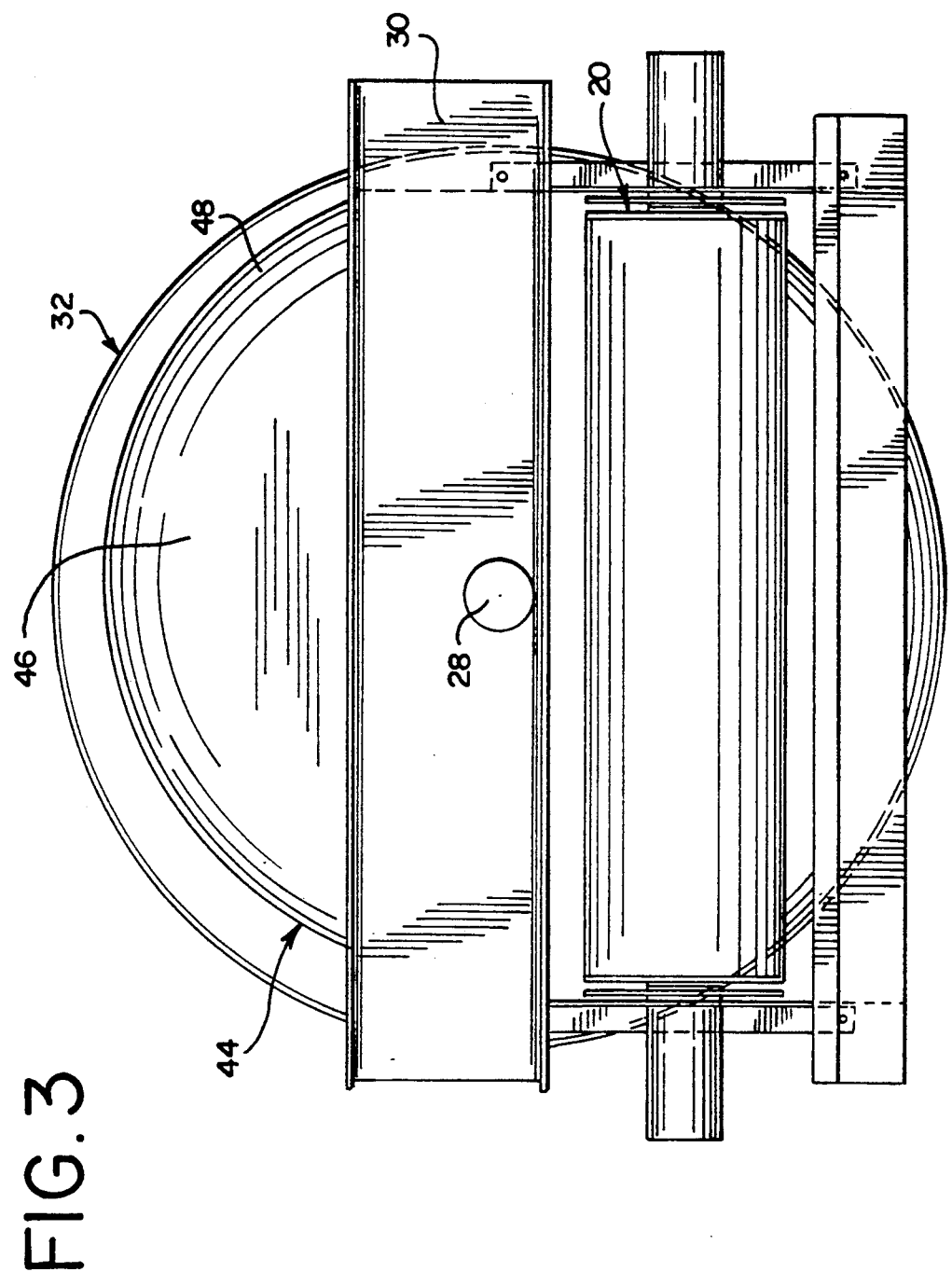
FIG. 3 is a front elevational view schematically illustrating a forward end of the rotor assembly of FIG. 2.
Figure 4:
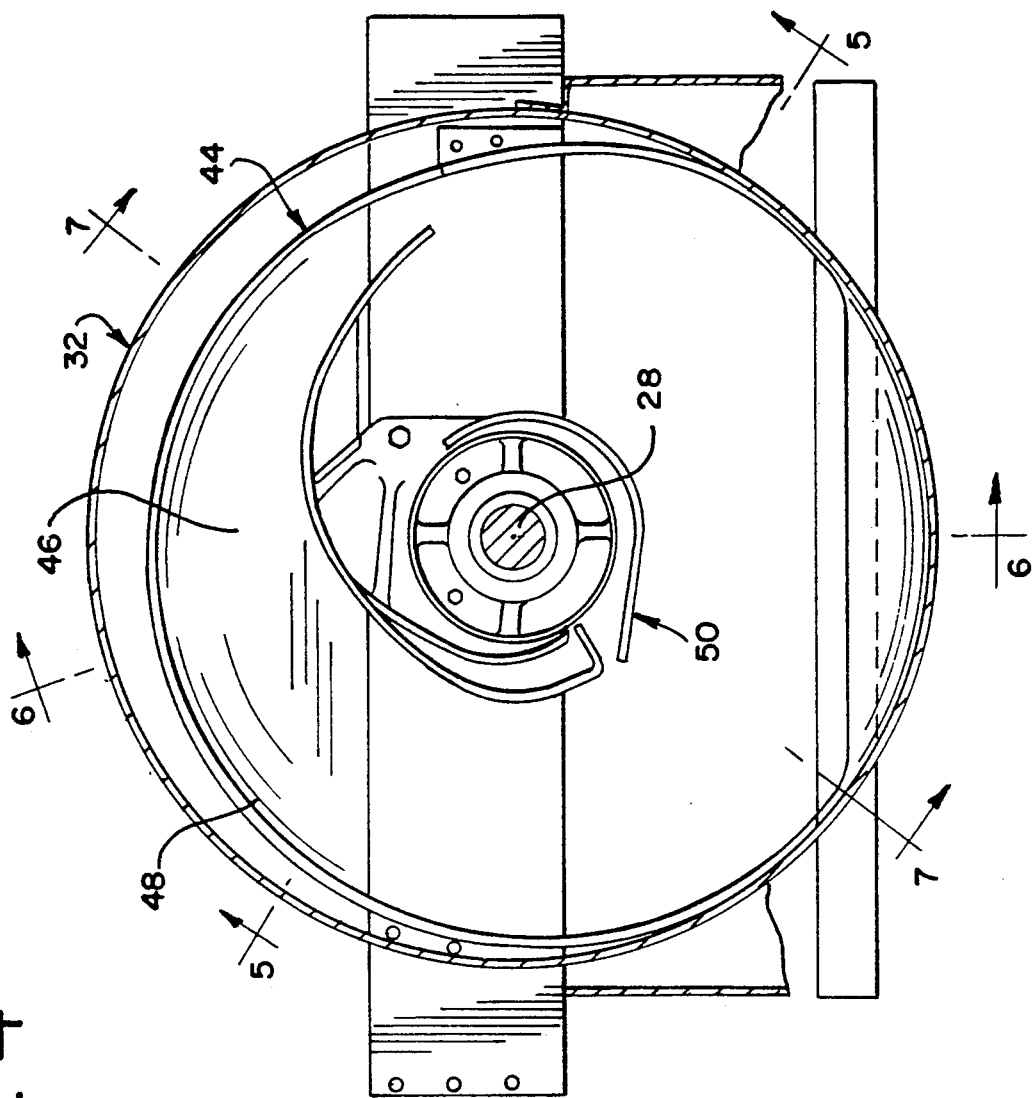
FIG. 4 is a rear sectional view taken along line 4—4 of FIG. 2.

The door assembly has a surface configuration which complements and coacts with the impeller 34 in positively moving crop material axially rearward through the transition section 32 of the rotor assembly 22. As shown in FIGS. 2, 3 and 4, the door assembly 44 includes a generally planar portion 46 arranged forward of the impeller 34 and which extends radially from the support member 30 and a ramped portion 48 provided about the periphery of the door assembly 44. As illustrated, portion 46 extends away from the support member 30 in a plane generally normal to the elongated axis of the rotor assembly 24 and has forward and rearward surfaces 47 and 49, respectively. In the illustrated embodiment, the ramped portion 48 extends from surface 46 and has an axially rearward configuration which extends circumferentially about a forward end of the impeller 34. Preferably, ramped surface 48 has a convex profile axially extending rearwardly toward the rotor.

Figure 7:
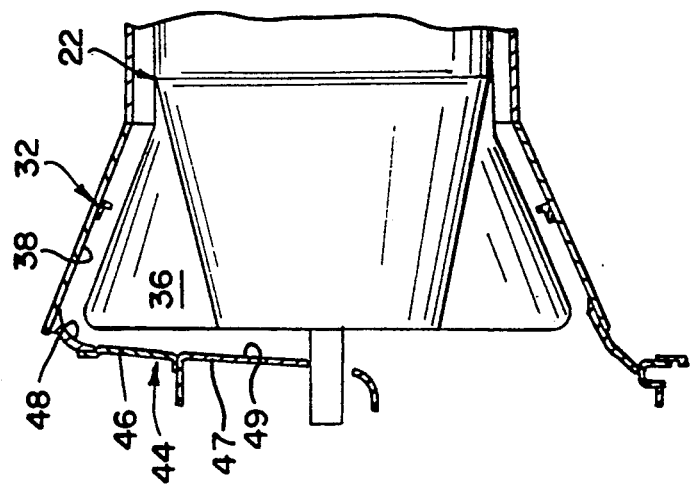
FIG. 7 is a longitudinal sectional view taken along line 7—7 of FIG. 4.
Figure 6:
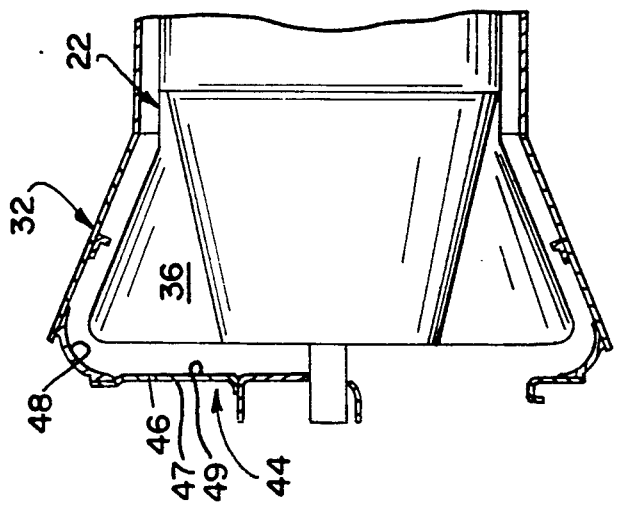
FIG. 6 is a longitudinal sectional view taken along line 6—6 of FIG. 4.
Figure 5:
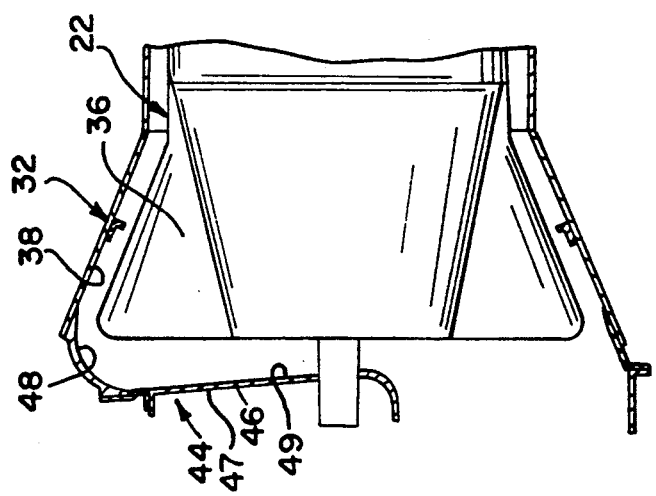
FIG. 5 is a longitudinal sectional view taken along line 5—5 of FIG. 4.

In a preferred form of the invention, the ramped portion 48 on the door assembly is configured to accommodate changes in volume as the crop material is advanced about the vaned impeller. As shown in FIGS. 5, 6, and 7, the configuration of the ramped portion 48 changes as a function of its angular orientation relative to the forward end of the transition section.

In planar cross section and as viewed in FIG. 4, the door assembly 44 has a gradual involute shape about its peripheral edge to allow room for crop material to endwind over the impeller leading edge plan of rotation as it advances toward the rotor and defines an open area about the impeller tip area. The involuted shape of the door assembly decreases the open area about the tip of the impeller from the upper directional side to the downward rotational direction side to induce rearward crop movement of material toward the rotor.

In a most preferred form of the invention, a portion of the door assembly 44 extends beneath the elongated axis of rotor casing 24. As will be appreciated, the door assembly will be configured to not interfere with introduction of crop material from the feeder mechanism 20 into the transition section 32 of the rotor assembly.

As illustrated in FIG. 4, the door assembly 44 further includes an arcuately formed anti-wrap vane 50. As shown, the anti-wrap vane 50 encircles and protects the front bearing 28 from having crop material wound thereabout.

In operation, the crop harvesting apparatus or header 18 reaps planted crop material and delivers it to the crop feeder mechanism 20. The crop feeder mechanism rearwardly advances and, ultimately, introduces the crop material into the open-ended transition section 32.

The crop material is discharged upwardly into the transition section 32 and the action of the vaned impeller 34 causes most material to move in a radial and rearward spiralling motion through the transition section. The whirling rotary action of the impeller 34 causes other crop material to likewise move radially outward. Portion 46 of the door assembly 44 will confine the crop material and direct same circumferentially outward toward the ramped portion 48. The configuration of the ramped portion 48 is such that the crop material discharged therefrom is rearwardly directed into the annular opening 38 thereby reducing crop material repeat on the downward rotational direction side by improving endwind efficiency.

Changing the ramped configuration on the door assembly 44 as a function of its angular orientation relative to the rotor casing provides maximum directional influence and consistent entrance clearance at the impeller tip orbit. Rearward movement of crop material is further augmented by the provision of the spiral transport fins 40 provided on the inside surface of the transition section 32.

Crop material is likewise carried downwardly by the impeller 34 below the extended axis of the rotor. In a preferred form of the invention, therefore, the ramped portion 48 extends beneath the longitudinal axis of the casing so as to impart a rearward motion to the crop material that is thrust downwardly by the impeller action.

The gradual involuted shape of the door assembly relative to the trace of the impeller blades is provided in appreciation that the volume of crop material traversing about the circumference of the impeller will change. Accordingly, the surface configuration of ramp portion 48 likewise changes to accommodate changes in speed and volume of the crop material relative to the angular orientation of the surface relative to the rotor casing.

The anti-wrap vane 50 inhibits crop material from becoming entangled with or entrained about the front bearing 28. The anti-wrap vane 50 is configured to develop a free flow of material outwardly and away from the front bearing thereby inhibiting a buildup of crop material about the front bearing which can ultimately clog the rotor assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An axial-flow combine comprising:
a frame having ground engaging wheels for allowing the combine to move over a field;
a generally tubular rotor casing mounted on said frame along an elongated axis and provided with an outwardly flared funnel like frusto-conical transition section designed for endwise reception of crop material;
a rotor disposed within said casing in coaxial relationship therewith, said rotor and casing having cooperating threshing instrumentalities arranged thereon;
a vaned impeller arranged at a forward end of said rotor and within said frusto-conical transition section; and
a door assembly extending across and at least partially closing a forward open end of said transition section, a portion of said door assembly defining a ramped surface configuration extending at least partially about the impeller to direct crop material over a leading edge of the impeller plan of rotation and positively move crop material axially rearwardly through the transition section of the rotor casing.

2. The axial-flow combine according to claim 1 with said rotor being rotatably supported at a forward end by bearing means, and said door assembly including an anti-wrap vane which at least partially encircles said bearing means to inhibit crop material from wrapping thereabout.

3. The axial-flow combine according to claim 1 wherein the ramped surface configuration of the door assembly defines a clearance area about the periphery of the vaned impeller which decreases from an upper rotational direction side of the impeller to a downward directional side of the impeller to induce axially rearward crop material movement through the transition section.

4. The axial-flow combine according to claim 1 wherein at least a portion of said door assembly extends above said elongated axis and at least a portion of said door assembly extends below said elongated axis.

5. An axial-flow combine comprising:
a tubular casing having an elongated fore-and-aft extending axis and an open forward end for receiving crop material;
a generally cylindrical rotor axially disposed in said tubular casing and journalled for rotation within said casing for threshing and separating crop material as the rotor is driven, said rotor having a vaned impeller arranged within and at the forward end of said casing; and
a door assembly having generally planar forward and rearward surfaces arranged to at least partially close a portion of the open forward end of said casing above the elongated axis of said casing, said door assembly having a ramped portion extending rearwardly away from said rear surface of said door assembly and circumferentially extending about a forward end of said impeller for positively moving crop material rearwardly through the casing.

6. An axial-flow combine comprising:
a tubular casing having an elongated fore-and-aft extending axis and an open forward end for receiving crop material;
a generally cylindrical rotor axially disposed in said tubular casing and journalled for rotation within said casing for threshing and separating crop material as the rotor is driven, said rotor having a vaned impeller arranged within and at the forward end of said casing; and
a door assembly arranged to at least partially close a portion of the open forward end of said casing above the axis of said casing, said door assembly having a rearwardly ramped surface configured to at least partially extend circumferentially about a forward end of said impeller for positively moving crop material rearwardly through the casing and wherein the ramped surface configuration of said door assembly changes as a function of its angular disposition about said casing.

7. An axial-flow combine comprising:
a tubular casing having an elongated fore-and-aft extending axis and an open forward end for receiving crop material;
a generally cylindrical rotor axially disposed in said tubular casing and journalled for rotation within said casing for threshing and separating crop material as the rotor is driven, said rotor having a vaned impeller arranged within and at the forward end of said casing; and
a door assembly arranged to at least partially close a portion of the open forward end of said casing above the axis of said casing, said door assembly having a rearwardly ramped surface portion extending below the axis of said casing and extending circumferentially about a forward end of said impeller for positively, moving crop material rearwardly through the casing.

8. An axial-flow combine comprising:
a fore-and-aft extending mobile frame;
material infeed means mounted on the frame;
a generally tubular casing mounted on said frame and having an open forward end arranged in material receiving relation to said infeed means;
a generally cylindrical rotor journalled for rotation about a fore-and-aft rotational axis within said casing for acting on the material as the rotor is driven within the casing, said rotor having a vaned impeller arranged within said casing at a forward end thereof, said impeller and casing being constructed and arranged relative to each other to define an annular space therebetween within which material is fed;
a door assembly secured to said frame forwardly of said impeller and having forward and rearward generally planar surfaces extending generally normal to said rotational axis to at least partially close the open forward end of said casing without interfering with said infeed means, a circumferential portion of said door assembly complementing said casing and having a ramped surface extending rearwardly away from said rear planar surface of said door assembly to facilitate material delivery into the annular space and rearwardly through the casing.

9. An axial-flow combine comprising:
a fore-and-aft extending mobile frame;
material infeed means mounted on the frame;
a generally tubular casing mounted on said frame and having an open forward end arranged in material receiving relation to said infeed means, said tubular casing having an outwardly flared transition section at a forward end thereof with a series of spiral transport vanes secured to an inner surface thereof;

a generally cylindrical rotor journalled for rotation about a fore-and-aft rotational axis within said casing for acting on the material as the rotor is driven within the casing, said rotor having a vaned impeller arranged within said casing at a forward end thereof, said impeller and casing being constructed and arranged relative to each other to define an annular space therebetween within which material is fed;

a door assembly secured to said frame forwardly of said impeller and lying in a plane passing through said rotational axis to at least partially close the open forward end of said casing without interfering with said infeed means, a circumferential edge of said door assembly complementing said casing and having a rearwardly extending ramped portion to facilitate material delivery into the annular space and rearwardly through the casing.

10. The axial-flow combine according to claim 9 wherein said ramped portion has a changing configuration depending upon its annular orientation relative to said casing.

* * * * *